United States Patent [19]
Zutz

[11] Patent Number: 5,642,890
[45] Date of Patent: Jul. 1, 1997

[54] SLIDE RING SEAL ASSEMBLY

[75] Inventor: Hans-Henning Zutz, Wermelskirchen, Germany

[73] Assignee: AE Goetze GmbH, Burscheid, Germany

[21] Appl. No.: 619,409

[22] Filed: Mar. 21, 1996

[30] Foreign Application Priority Data

Mar. 30, 1995 [DE] Germany ................. 195 11 708.5

[51] Int. Cl.⁶ ................................................. F16J 15/38
[52] U.S. Cl. ................................ 277/92; 277/85; 277/88
[58] Field of Search ............................... 277/85, 88, 92, 277/95, 136, 81 R

[56] References Cited

U.S. PATENT DOCUMENTS

| 2,365,046 | 12/1944 | Bottomley | 277/92 |
| 3,273,901 | 9/1966 | Schmengler | 277/92 |
| 3,767,214 | 10/1973 | Kawamura | 277/92 |
| 4,195,852 | 4/1980 | Roley et al. | 277/92 |
| 4,256,315 | 3/1981 | Larson et al. | |
| 4,890,849 | 1/1990 | Easen | 277/136 |
| 5,195,755 | 3/1993 | Ootsuka et al. | 277/92 |

FOREIGN PATENT DOCUMENTS

| 27 26 033 | 12/1977 | Germany . | |
| 31 41 512 | 5/1983 | Germany . | |
| 3836717 | 5/1990 | Germany | 277/92 |

*Primary Examiner*—Daniel G. DePumpo
*Attorney, Agent, or Firm*—Spencer & Frank

[57] ABSTRACT

A slide ring seal assembly includes a slide ring having a slide face for engaging a slide face of an additional slide ring and a plastic part having a conical face. An annular elastic body surrounds and engages the conical face and is adapted to be compressed, in an installed state, by the conical face and a face of a machine component. An annular sealing body is formed on the plastic part as a one-piece, integral member therewith for sealingly contacting a machine component in the installed state.

6 Claims, 1 Drawing Sheet

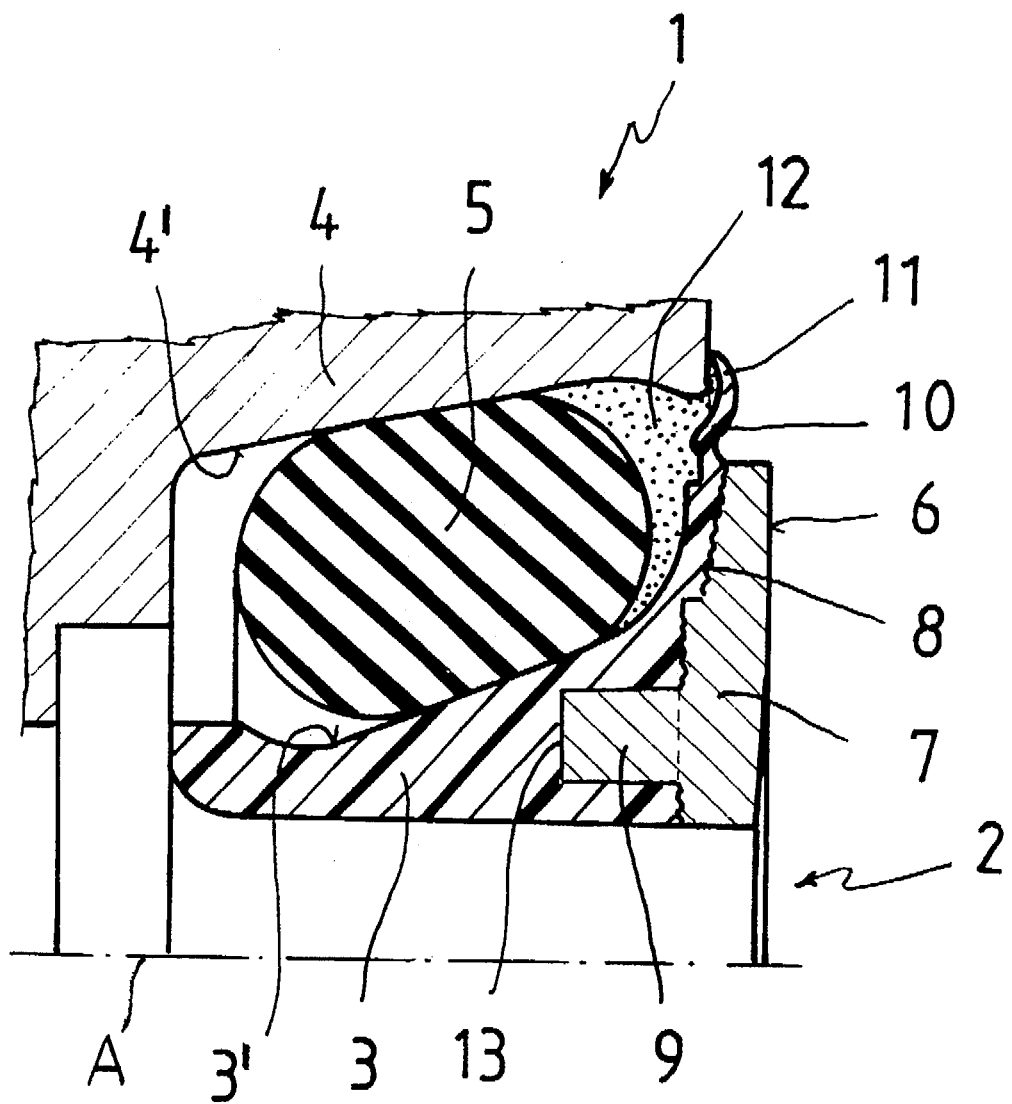

SLIDE RING SEAL ASSEMBLY

BACKGROUND OF THE INVENTION

This invention relates to a slide ring seal assembly, particularly a seal for use in a running gear and is of the type which has a first slide ring and an axially adjoining second slide ring (counterring) which is in sliding contact with the first slide ring. Both slide rings have a conical circumferential surface for engaging an annular elastic body. In the installed state the annular elastic bodies are compressed between the conical circumferential surfaces and a corresponding conical circumferential surface of a machine component. Further, adjacent each slide ring a respective sealing body is provided which is affixed to the associated slide ring.

Slide ring seal assemblies of the above-outlined type are used at locations where the stresses causing wear are the highest. Thus, for example, such an environment is a drive shaft of heavy machinery since these structures are exposed to substantial wear from dust, sand, sludge or stones.

A conventional slide ring seal assembly of the above-outlined type has, however, the significant disadvantage that the space between the annular elastic bodies and the machine components are entirely filled with dirt. Upon drying and hardening of the dirt the freedom of motion of the slide ring seal assembly is substantially impeded. The resilient effect proper of the annular elastic bodies may no longer be performed as designed which may lead to a premature breakdown of the slide ring seal assembly. In order to prevent such an occurrence, additional protecting bodies have been arranged adjacent the annular elastic bodies for preventing the penetration of dirt. Such an arrangement is disclosed, for example, in German Patent No. 38 36 717.

A disadvantage of the last-noted prior art structure resides in that to install the slide ring seal assembly, a plurality of individual components have to be mounted separately. Also, the machine component parts receiving the protecting bodies have to be adapted accordingly.

SUMMARY OF THE INVENTION

It is an object of the invention to provide an improved slide ring seal assembly of the above-outlined type whose installation is facilitated and the manufacturing costs are reduced.

This object and others to become apparent as the specification progresses, are accomplished by the invention, according to which, briefly stated, the slide ring seal assembly includes a slide ring having a slide face for engaging a slide face of an additional slide ring and a plastic part having a conical face. An annular elastic body surrounds and engages the conical face and is adapted to be compressed, in an installed state, by the conical face and a face of a machine component. An annular sealing body is formed on the plastic part as a one-piece, integral member therewith for sealingly contacting a machine component in the installed state.

By virtue of the measures according to the invention, it is feasible to install the annular elastic bodies simultaneously with the slide rings. Modifications of the mounting space for slide ring seal assemblies of conventional construction need not be made for accommodating the sealing construction according to the invention. Consequently, it is feasible to replace the present slide ring seal assemblies with new slide ring seal assemblies without additional cost.

BRIEF DESCRIPTION OF THE DRAWING

The sole FIGURE is an axial sectional view of a preferred embodiment of the invention.

DESCRIPTION OF THE PREFERRED EMBODIMENT

Turning to the FIGURE, the slide ring seal assembly generally designated at 1 comprises a slide ring generally designated at 2. While the FIGURE only illustrates the left side of the construction, it is to be understood that a mirror image of the components shown in the FIGURE axially adjoin the slide ring 2. Thus, the actual structure includes a second slide ring which is identical to the slide ring 2 and which is in a face-to-face sliding contact with the slide ring 2 in a manner as shown, for example, in FIG. 1 of German Offenlegungsschrift (application published without examination) 31 41 512 which discloses a prior-art slide ring seal assembly. It is also noted that since the illustrated construction is a rotational unit, the actual structure should also be considered to be present as a mirror image under the assembly axis A. The invention will be described only in connection with the illustrated left-hand side of the slide ring seal assembly 1; the invention may find application in the identical, non-illustrated right-hand structure as well.

The slide ring 2 has a generally L-shaped axially sectional outline and has a conical circumferential surface 3'. The corresponding machine component 4 is also provided with a conical circumferential surface, designated at 4'. An annular elastic body 5 is radially positioned between and compressed by the conical surfaces 3', 4'. The stress imparted on the annular elastic body 5 presses the slide ring 2 against the non-illustrated, symmetrically arranged second slide ring.

According to the invention, the slide ring 2 is a composite member formed of a sleeve-like skirt 3 made of a synthetic material such as glass fiber filled polyamid and a disk like, wear-resistant metal body 7. The conical face 3' is constituted by an outer surface of the skirt 3, while the metal body 7 has a sliding surface 6 for engaging a similar surface of the non-illustrated second slide ring (counterring). For a better anchoring of the metal body 7 with skirt 3, the metal body 7 has a roughened surface portion 8 which is in a face-to-face engagement with the skirt 3. To prevent a relative rotation between the metal body 7 and the skirt part 3 a recess 13 is provided in the skirt 3 into which extends a projection 9 of the metal body 7. A plurality of such projections 9 and recesses 13 may be arranged circumferentially, for example, in a uniform distribution.

In the alternative, the metal body 7 is positioned in an injection molding die and subsequently the skirt 3 is provided by means of an injection molding process.

For protecting the annular elastic body 5 from penetrating dirt, on the radial end region of the skirt 3 adjoining the metal body 7 an annular sealing body 10 is formed which has a sealing lip 11 that sealingly lies against the surface of the machine component 4 in the installed stage, at a location spaced from the slide ring 2. As seen in the Figure, the annular sealing body 10 readially bridges the annular gap between the slide ring 2 and the machine component 4 and thus prevents dirt form penetrating from the outside and gaining access to the elastic body 5. According to the invention the skirt 3 and the sealing body 10 form a one-piece, integral component. It is further feasible to fill the space between the annular elastic body 5 and the sealing body 10 with grease 12 to provide an additional protection against penetrating dirt.

It will be understood that the above description of the present invention is susceptible to various modifications, changes and adaptations, and the same are intended to be comprehended within the meaning and range of equivalents of the appended claims.

What is claimed is:

1. A slide ring seal assembly having an assembly axis and comprising
   (a) a slide ring arranged coaxially with said assembly axis and having
       (1) a slide face for engaging a slide face of an additional slide ring;
       (2) a plastic part having a conical face surrounding said assembly axis and axially extending from said slide face;
   (b) an annular elastic body surrounding and engaging said conical face and being adapted to be compressed, in an installed state, by said conical face and a face of a machine component; and
   (c) an annular sealing body formed on said plastic part as a one-piece, integral member therewith for sealingly contacting a machine component in the installed state at a location spaced from said slide ring for preventing penetration and access of dirt to said annular elastic body through a clearance between said slide ring and the machine component.

2. The slide ring seal assembly as defined in claim 1, wherein said annular sealing body is situated at an axial end of said conical face adjacent said slide face; said annular sealing body comprising an annular sealing lip.

3. A slide ring seal assembly having an assembly axis and comprising
   (a) a slide ring arranged coaxially with said assembly axis and composed of
       (1) a wear-resistant metal body surrounding said assembly axis and having a slide face for engaging a slide face of an additional slide ring;
       (2) a plastic skirt having a conical face surrounding said assembly axis and axially extending from said metal body;
   (b) an annular elastic body surrounding and engaging said conical face and being adapted to be compressed, in an installed state, by said conical face and a face of a machine component; and
   (c) an annular sealing body formed on said plastic skirt as a one-piece, integral member therewith for sealingly contacting a machine component in the installed state at a location spaced from said slide ring for preventing penetration and access of dirt to said annular elastic body through a clearance between said slide ring and the machine component.

4. The slide ring seal assembly as defined in claim 3, further comprising securing means for attaching said plastic skirt to said metal body.

5. The slide ring seal assembly as defined in claim 4, wherein said securing means comprises a projection attached to and extending from said metal body and a recess provided in said skirt and receiving said projection.

6. The slide ring seal assembly as defined in claim 4, wherein said securing means comprises a roughened surface provided on said metal body and being in engagement with a surface of said skirt.

* * * * *